United States Patent
Fein

[15] 3,679,975
[45] July 25, 1972

[54] RESISTIVE MODULATOR

[72] Inventor: Harry Fein, 832 Quarter Mile Rd., Orange, Conn. 06477

[22] Filed: Aug. 6, 1970

[21] Appl. No.: 61,545

[52] U.S. Cl. ..............................324/118, 324/99 R, 330/10, 332/47
[51] Int. Cl. ..................................G01r 19/18, G01r 17/06
[58] Field of Search..............324/118, 99; 332/47; 307/304; 330/10

[56] References Cited

UNITED STATES PATENTS

| | | |
|---|---|---|
| 3,435,375 | 3/1969 | Miller, Jr. ..........................332/47 X |
| 3,559,058 | 1/1971 | Ludin................................324/99 R |
| 2,942,188 | 6/1960 | Mitchell.............................324/118 |

Primary Examiner—Rudolph V. Rolinec
Assistant Examiner—Ernest F. Karlsen
Attorney—Fishman and Van Kirk

[57] ABSTRACT

Circuitry for sensing applied potentials, the circuitry presenting a high impedance to the source of the potentials to be sensed, is disclosed. The invention employs a matched pair of field effect transistors which are operated in accordance with a resistive modulation technique. In the disclosed embodiment the transistors are connected in opposite legs of a balanced bridge circuit and are excited by alternating the current, input signals applied to the gate of one of the transistors producing a small change in the resistance of that transistor.

3 Claims, 1 Drawing Figure

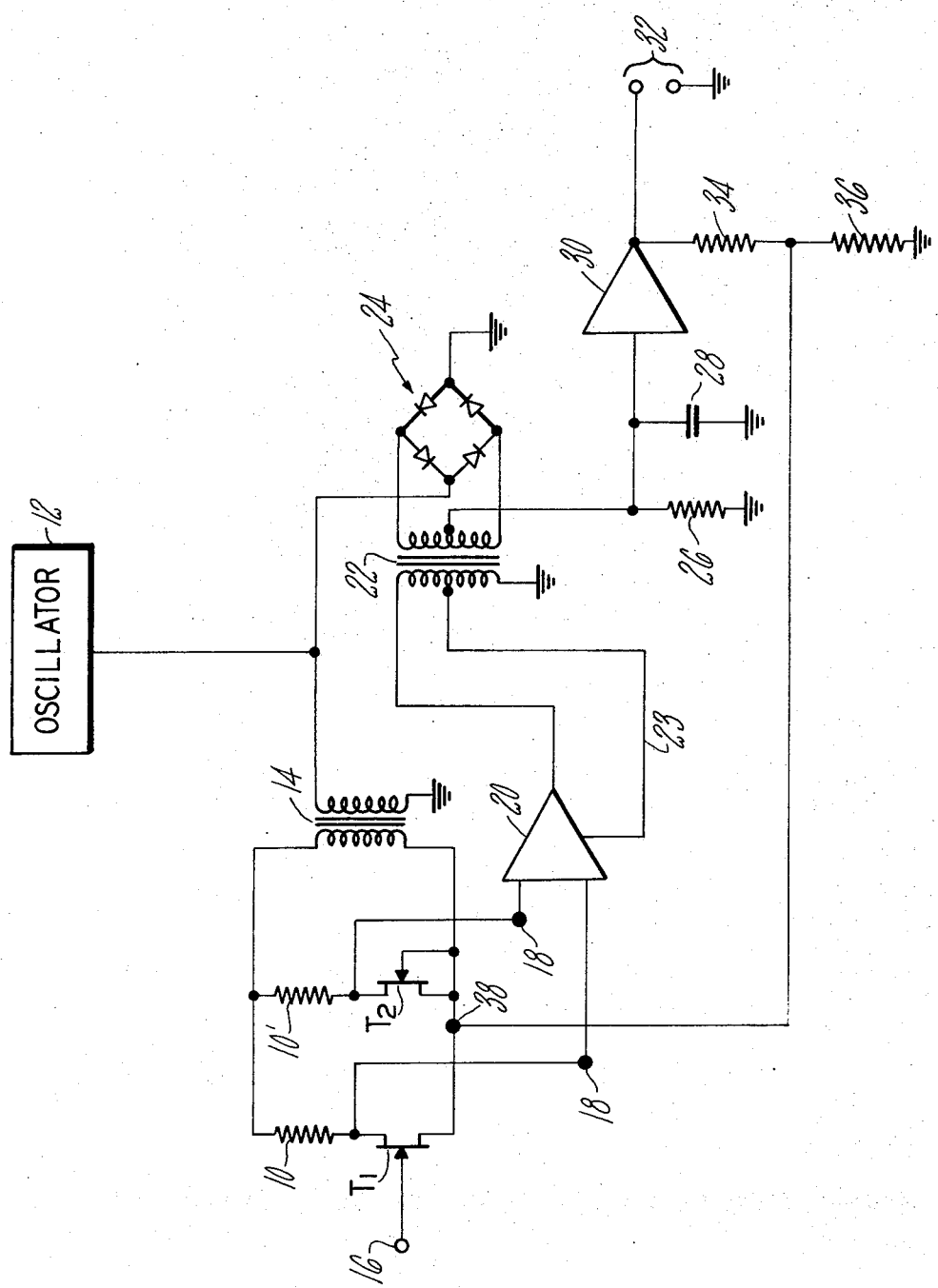
INVENTOR
HARRY FEIN
BY [signature]
ATTORNEYS

RESISTIVE MODULATOR

BACKGROUND OF THE INVENTION

1. Field of the Invention

The present invention relates to the measurement of electric potentials. More specifically, the present invention is directed to apparatus which enables the measurement of an electrical potential while imposing no significant loading effect on the source of the thus measured potential. Accordingly, general objects of the present invention are to provide novel and improved methods and apparatus of such character.

2. Description of the Prior Art

While not limited thereto in its utility, the present invention is particularly well suited for use in an electrometer. An electrometer is an instrument capable of detecting or measuring a small electric charge. These instruments are most usually employed in an environment where the voltage to be measured is associated with a high output resistance. With the exception of the so-called "direct-indicating" electrometers, these instruments have usually taken the form of special vacuum tube amplifiers which detect and measure electric current by sensing the voltage drop produced by the current through a known resistance. As is well known, the electrometer-type of vacuum tube is a specially designed device capable of operation in electrometer applications only and designed to have low control grid current and a high degree of stability. These specially designed tubes represent an attempt to present, to the source to be measured, an input resistance as close to infinity as it is physically possible to attain. However, prior vacuum tube electrometers have been characterized by slow response time and drift which may be overcome only by resort to rather complex and thus expensive and unreliable circuitry. Further, the specially designed vacuum tubes employed in prior art electrometers have been very sensitive to mechanical vibration (microphonics) and to variations in temperature.

In recent years, the availability of solid state devices such as field effect transistors (FET's) and insulated gate field effect transistors (IGFET's) has made possible the manufacture of amplifiers with moderately high input resistance and low leakage current. These transistor amplifiers are substantially free from sensitivity to mechanical vibration and temperature induced drift such as characterized prior art vacuum tube electrometers. Employing these solid state devices, amplifiers with input resistance of thousands of megohms and leakage currents in the picoampere ($10^{-12\ 12}$ amperes) range have been realized. Nevertheless, the prior art high input impedance transistor amplifiers do not approach the degree of input resistance and minuteness of leakage current and base line stability essential in many critical applications which involve the use of electrometer amplifiers.

In an effort to overcome drift and other of the above briefly discussed problems inherent in prior art electrometer amplifiers, another category of these instruments has been developed. This further category of electrometers may be referred to generally as "breaker amplifiers." The breaker amplifier, in a general sense, is a device which resorts to generation or modulation of an alternating current or voltage from or by the potential to be measured. In its most basic form, this class of device is represented by the well known vibrating reed electrometer. Another well known modulation technique involves "capacitance modulation" wherein a capacitor with an air dielectric is electro-mechanically or electro-magnetically vibrated in such a manner that an alternating current is developed which is proportional to the magnitude of the applied potential. The "capacitance modulation" type electrometers have achieved an input resistance in the range of $10^{15}$ ohms. The alternating currents generated by the prior art devices which are based on a modulation principal are converted to alternating potentials which are amplified and rectified to direct current. The fact that the amplification process is inherently A.C. means that drift and noise can be appreciably minimized through the use of negative feedback and filtering in the A.C. amplifiers. Prior art electrometer devices which operate on a modulation principal have, however, been deficient from the standpoint of response time and service life. Vibrators and the like obviously compare unfavorably with solid state devices which have no moving parts. Not only is the wear associated with moving parts a problem, but such devices are characterized by a phase lag with respect to the excitation potential. Further, devices with moving parts are inherently position; i.e., horizontal or vertical; sensitive and of comparatively large size.

SUMMARY OF THE INVENTION

The present invention overcomes the foregoing and other disadvantages of the prior art by providing a novel circuit which permits the measurement of potentials with no significant loading effect on the source of potential. In accordance with the present invention, a matched pair of field effect transistors are operated on a "resistive modulation" principal.

In the disclosed embodiment, the field effect transistors are connected in opposite legs of a bridge circuit and are excited by alternating current. The bridge is maintained in a balanced condition by means of a novel feedback arrangement. Accordingly, there will be no current flow through the FET's and an input voltage signal applied to the gate of one of the FET's produces a small change in the resistance of the solid state device. The present invention thus operates on a "resistive modulation" principal.

The output of the bridge circuit is delivered to a differential A.C. amplifier which detects the resistance change produced by the applied potential. The output of the amplifier is an alternating current "unbalance" signal which is rectified by a synchronous detector; the detector providing a D.C. output voltage having an amplitude proportional to the amount of bridge unbalance and a polarity identical to that of the applied input voltage. The oscillator which provides the reference signal for the synchronous detector also produces the excitation voltage for the bridge circuit. As previously noted, a portion of the D.C. output voltage is compared, after further amplification, with the original applied potential thereby maintaining the bridge circuit in a balanced condition.

BRIEF DESCRIPTION OF THE DRAWING

The present invention may be better understood and its numerous objects and advantages will become apparent to those skilled in the art by reference to the accompanying drawing which is a schematic showing of a preferred embodiment of the invention.

DESCRIPTION OF THE PREFERRED EMBODIMENT

With reference now to the drawing, the disclosed preferred embodiment of the invention comprises a matched pair of field effect transistors T1 and T2 and two precision matched resistors 10 and 10' arranged in the form of a Wheatstone bridge. The bridge circuit, which is initially carefully balanced, is excited by an alternating current sine wave which is applied thereto from an oscillator 12 via a transformer 14. The frequency of oscillator 12 is not critical and may be any value from as low as several Hertz to several mega-Hertz. The amplitude of the oscillator excitation voltage, however, must be small so as to operate the FET's as resistors rather than as amplifiers.

The potentials to be measured are applied to the gate of transistor T1 via an input terminal 16. As a consequence of the low level of excitation and the balanced condition of the bridge, application of a small potential to input terminal 16 will cause the resistance of field effect transistor T1 to increase or decrease in accordance with the polarity and magnitude of the applied voltage. This change in resistance will, of course, result in an unbalanced condition of the bridge. As noted, since the bridge is initially carefully balanced for zero applied volts, an unbalance results in the appearance of an alternating voltage across the output terminals 18—18 of the bridge circuit.

The A.C. voltage which results as a consequence of unbalancing the bridge circuit is applied to a differential A.C. amplifier 20. Accordingly, a signal commensurate with the potential applied at terminal 16 is amplified in an inherently stable A.C. amplifier. The output signal from amplifier 20 is applied to the primary winding of a transformer 22. A portion of the voltage induced in the primary winding of transformer 22 may be fed back, via conductor 23, to amplifier 20 to enhance the stability of the circuit.

A synchronous detector, indicated generally at 24, is connected across the secondary winding of transformer 22. Detector 24 rectifies the voltage induced in the secondary winding of transformer 22. It is to be noted that oscillator 12, which provides the excitation for the bridge circuit, also furnishes the reference signal for the diodes of detector 24. The center-tap of the secondary winding of transformer 22 is connected to an RC filter circuit comprising resistor 26 and capacitor 28. The filtered D.C. voltage, which has an amplitude proportional to the amount of bridge unbalance and a polarity identical to that of the applied unknown potential, may be further amplified by a D.C. amplifier 30 before being applied to the circuit output terminals 32—32. The major portion of the gain of the circuit is achieved in amplifier 20 and thus any drift of D.C. amplifier 30 will not have a deleterious effect on system operation. The principal contribution of amplifier 30 is that it functions as an impedance buffer thereby permitting selection of the circuit output impedance.

A voltage divider comprised of resistors 34 and 36 is connected across the circuit output terminals. A small potential is tapped off this voltage divider and fed back to the bridge circuit wherein it is compared against the original applied potential at point 38 thereby compelling the bridge to return to a balanced condition. Restated, since the difference potential between input terminal 16 and point 38 will be virtually zero volts, the gate junction of T1 will appear to possess virtually infinite resistance and current will not be able to flow between terminal 16 and any other point of the bridge circuit.

In operation, the above-described circuit generates an output signal which will precisely follow an unknown applied voltage. Since input terminal 16 and point 38 of the bridge circuit will, due to the feedback from the output voltage divider, be nearly equal in potential, all terminals of the field effect transistors T1 and T2 will be at this same potential. Accordingly, as noted above, current will not be able to flow between input terminal 16 and any other point of the bridge circuit. Thus, a potential measuring apparatus with virtually infinite input resistance results. Since transistors T1 and T2 are matched, transistors T2 will provide a thermally matched reference resistor which will track in resistance with the transistor T1 as the ambient temperature varies. Therefore, the present invention is free of temperature induced drift.

In a working model of the invention, transistors T1 and T2 of the input bridge circuit comprised a Siliconix Inc. type 2N5199 which is a dual field effect transistor. The resistors 10 and 10' were a pair of matched 1,000 ohm 0.1 percent metal film resistors. The output frequency of oscillator 12 was 1KHz sinusoidal. The peak to peak amplitude of the sinusoid was 100 millivolts applied across the bridge circuit. The synchronous detector 24 may be any commercially available ring demodulator such as the type described at page 132 of "Servo Mechanism Practice" (second edition) by Ahrendt and Savant, published by McGraw-Hill Publishing Company in 1960.

As should now be apparent to those skilled in the art, the present invention employs a matched pair of field effect transistors driven by low voltage alternating current whereby the solid state devices are not operated in their normal mode as amplifiers but rather function as voltage variable resistors. In the disclosed embodiment, the resistive mode of operation of the FET's is exploited by incorporating the semiconductor devices within a bridge configuration which constitutes a modulator. A conversion of the applied potential to a proportional A.C. signal makes possible the use of an A.C. amplifier which is inherently capable of stable, drift-free gain by the use of negative feedback. The bridge circuit of the disclosed embodiment is operated as a proportional and linear modulator rather than a chopper modulator or other form of off-on or switched modulator of the type known in the prior art. Alternatively, the matched pair of FET's may be employed in a modified Wien Bridge Oscillator to vary the amplitude of the oscillator output voltage. In such an arrangement, the pair of FET's may be employed to control the negative feedback to an operational amplifier; the junction of the transistors being connected to the inverting terminal of the amplifier.

Among its many advantages, some of which have been discussed above, the present invention is capable of higher speed operation with potentially longer life with less maintenance and repair than prior art devices of like character. The initial cost of the invention is also considerably less than prior art electrometer amplifiers and the invention may, if desired, be produced employing integrated circuit techniques.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A voltage responsive device characterized by a high input impedance, said device comprising:
   modulator means comprising an initially balanced bridge circuit including a pair of matched resistors in opposite legs, said bridge circuit further including first and second field effect transistors in opposite legs;
   means for applying an alternating excitation voltage across said bridge circuit, the amplitude of said excitation voltage being selected so as to bias said field effect transistors for operation as resistance modulators;
   means for applying a direct current input signal to the gate electrode of said first field effect transistor to thereby vary the resistance of said first transistor;
   differential amplifier means connected to said modulator means for receiving and amplifying alternating potentials commensurate with the unbalancing of said bridge circuit resulting from variations in the effective resistance of said first transistor;
   detector means;
   means applying the output of said differential amplifier means to said detector means whereby said detector means will provide a direct current output voltage commensurate with the magnitude of the input signal; and
   means for feeding a portion of said direct current output voltage back to said bridge circuit to maintain said bridge circuit in a balanced condition.

2. The apparatus of claim 1 wherein said detector means comprises:
   a synchronous detector; and
   means for applying an A.C. reference signal to said detector from said means for applying an excitation current to said modulator means.

3. The apparatus of claim 2 wherein said means for feeding back a portion of the output voltage comprises:
   direct current amplifier means connected to receive the output of said detector means, said direct current amplifier means functioning as an impedance buffer;
   voltage divider means connected to the output terminal of said direct current amplifier means; and
   means connecting an intermediate point of said voltage divider to the common point of said bridge circuit which is connected to said first and second transistors.

* * * * *